United States Patent [19]
Pastor

[11] 3,932,597
[45] Jan. 13, 1976

[54] PURIFICATION OF ALKALI METAL HALIDES

[75] Inventor: Ricardo C. Pastor, Manhattan Beach, Calif.

[73] Assignee: Hughes Aircraft Company, Culver City, Calif.

[22] Filed: June 17, 1975

[21] Appl. No.: 587,746

Related U.S. Application Data

[63] Continuation of Ser. No. 416,899, Nov. 19, 1973, abandoned.

[52] U.S. Cl. ............... 423/499; 423/491; 423/500
[51] Int. Cl.² ... C01D 3/20; C01D 3/04; C01D 3/10; C01D 3/12
[58] Field of Search ......... 423/499, 500, 179, 497, 423/498, 491

[56] References Cited
UNITED STATES PATENTS

| | | | |
|---|---|---|---|
| 792,632 | 6/1905 | Tee | 423/499 X |
| 1,927,108 | 9/1933 | Zimmermann | 423/499 |
| 2,770,526 | 11/1956 | Lander | 423/497 X |
| 2,958,576 | 11/1960 | Olstowski | 423/490 |
| 3,067,006 | 12/1962 | Ebert et al. | 423/498 X |
| 3,338,668 | 8/1967 | Lyons et al. | 423/498 |
| 3,395,977 | 8/1968 | Nadler | 423/498 |
| 3,472,789 | 10/1969 | Cottrell | 423/490 |
| 3,565,700 | 2/1971 | Root | 423/490 X |
| 3,826,817 | 7/1974 | Pastor et al. | 423/499 |
| 3,840,651 | 10/1974 | Ireland | 423/179 |

FOREIGN PATENTS OR APPLICATIONS

| | | | |
|---|---|---|---|
| 1,137,582 | 12/1968 | United Kingdom | 423/499 |
| 1,123,991 | 8/1968 | United Kingdom | 423/499 |
| 45-32527 | 10/1970 | Japan | 423/499 |

*Primary Examiner*—Edward Stern
*Attorney, Agent, or Firm*—B. T. Hogan, Jr.; W. H. MacAllister

[57] ABSTRACT

A new process or method has been developed whereby the purity of metal halides, prepared by conventional methods, can be significantly upgraded. The process, which includes a scrubbing of metal halides with a halide-source species in the vapor phase, has been shown to be effective not only in reducing the concentration of oxyanion impurities and volatile cation halide impurities, but effective in reducing hydroxyl ion ($OH^-$) contaminations as well.

Metal halides purified by this method are particularly useful as starting materials for growing optically pure metal halide crystals.

4 Claims, 1 Drawing Figure

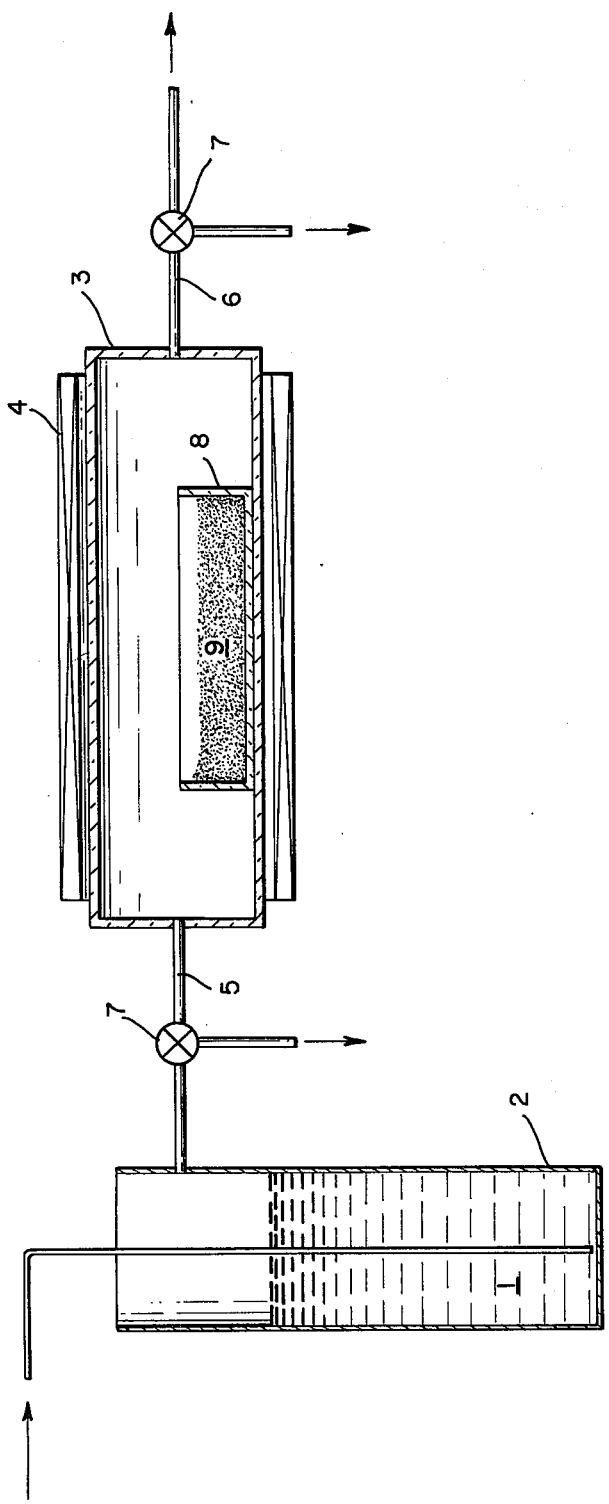

PURIFICATION OF ALKALI METAL HALIDES

The invention herein described was made in the course of or under a contract or subcontract with the Air Force Weapons Laboratory.

This application is a continuation of application Ser. No. 416,899, filed Nov. 19, 1973, now abandoned.

CROSS REFERENCE TO RELATED APPLICATIONS

An invention directed to the synthesis of metal halides having extremely low hydroxyl ion contamination levels was disclosed in U.S. Pat. application No. 275,130 filed July 26, 1972 by R. C. Pastor et al.

BACKGROUND OF THE INVENTION

1. Field of the Invention.

This invention is concerned with methods for the purification of inorganic salts in general and more particularly with the purification of metal halides.

2. Description of the Prior Art.

Metal halides are well-known in the art. However, comparatively recent developments in the field of laser technology has resulted in a demand for metal halides that are extremely pure. While powdered KCl 99.999% pure in the metal ion is easily available, the anion purity may not be any better than 99.9% pure.

Metal halide crystals grown from state-of-the-art purified starting materials contain trace cation and anion contaminants which when subject to high energy laser applications, cause undesirable optical absorption and structural failures. Anion purity is a prime concern for high-power IR window material, because anions, particularly polyatomic ones like $OH^-$, contribute significantly to IR absorption through the fundamentals and combinations of their vibrational motions. The usual metal ion impurities mostly affect transmission in the visible or ultraviolet. Bivalent metal ion doping has been employed to increase the crystal's mechanical strength. However, this process exacts a tradeoff in the IR transmission, possibly due to the ability of bivalent cation impurities to stabilize the hydroxide ion ($OH^-$) and cation vacancies in alkali metal halides. Also, because of the extremely limited solubility of such dopants in the pure solid, the achievement of bulk homogeneity over a large piece presents a severe constraint.

The patent literature (J. O. Hay, U.S. Pat. No. 2,640,755) discloses an alkali metal halide purification method based on the addition of halide reactants to the metal halide desired to be purified in solution to form compounds with the impurities which can be precipitated from the solution and effectively separated from the target compound. This process is a multistep one and limited in effectivity in that it only tends to remove metal ion impurities.

My invention is considerably more efficient in terms of steps required to complete the process and in terms of the relative purity of the resultant product. It is possible, by utilizing my invention, to proceed from the purification of metal halide powders to the growth of optically pure metal halide crystals in succession with no intervening handling of the material.

SUMMARY OF THE INVENTION

I have discovered that crystalline halide powder, ≤ 1mm across, can be scrubbed through the interior not only from $OH^-$, but also from the lower halide members (e.g., in chloride, $Br^-$ and $I^-$), other oxyanion impurities and volatile cation halide impurities by treatment with halide-source vapors and casting the purified material in the form of an ingot which reduces the specific surface of the material. This process yields ultra pure halides which can serve as a convenient charge for ultra pure crystal growth required for the fabrication of optical components such as prism and windows for high-power lasers.

BRIEF DESCRIPTION OF THE DRAWING

The FIGURE is a schematic diagram of an apparatus for purification and casting of metal halide powder.

DESCRIPTION OF THE INVENTION

Metal halide crystals exhibit promise as effective materials for the fabrication of windows for laser applications. Studies conducted to date indicate that the usefulness of these materials is limited by the effects of trace contaminants within the crystals which either absorb energy and/or cause structural failures. Inasmuch as the relationship between ultra pure metal halide crystals and the purity of the starting materials from which the crystals are grown is obvious, the elimination of impurities in metal halide powders prior to their use in crystal growth applications is an obvious prerequisite for the preparation of highly transparent materials. Anion purity is a prime concern for high-power IR window material, because anions, particularly polyatomic ones like $OH^-$, contribute significantly to IR absorption through the fundamentals and combinations of their vibrational motions. The usual metal ion impurities mostly affect transmission in the visible or ultraviolet.

When the impurities (cation or anion) are closely similar in properties to their host species, purification is especially difficult. In halides ($X^-$) free of other halides, the anion impurities which are most difficult to cope with are the pseudo-halides, e.g., $H^-$, $OH^-$, $NH^-_2$, $CN^-$, etc. Such impurities have their free-halogen ($X_2$) analogues for the sources of the ions, e.g., $H_2$, $(OH)_2$ or hydrogen peroxide, $(NH_2)_2$ or hydrazine, $(CN)_2$ or cyanogen, etc., as well as the halogen-hydride (HX) analogues, e.g., $H_2$, HOH or $H_2O$, $HNH_2$ or $NH_3$, or HCN, etc. Many of these pseudo-halides are eliminated in the chemical processing of the condensed phase (c) by providing the free halogen ($X_2$) in the vapor phase (g). The actual details of the reaction mechanisms are not known in most cases, but are obviously important in designing purification procedures. The nature of the ionic or atomic reactant (for example, atomic Cl, ionic $Cl^-$, or molecular $Cl_2$) helps determine if the reactant must diffuse into the bulk crystal and react there with the psuedo-halide, with the reaction product diffusing out, or if, on the other hand, the pseudo-halide impurity must diffuse to the surface to react with the halogen species. The relative importance of these alternative paths changes with the choice of halide crystal, the dominant impurities, the halogen source, and temperature; thus a wide range of variables is available for optimizing the purification procedure.

I have found that metal halide powders can be scrubbed by a reactive atmosphere processing (RAP) technique which tends to effectively reduce the concentrations of cation and anion contaminants that is superior to conventional recrystallization from solution methods which tend to expose the purified product to moisture.

Due to the ubiquitous nature of $H_2O$, my RAP technique is aimed at the exclusion of $OH^-$. The mole fraction of OH⁻ in the condensed phase, C, is proportional to the ratio of the concentration (pressure) of the two competing sources in the gas phase, $$C = \frac{[OH^-(c)]}{[X^-(c)]} = K \frac{P_{H_2O}}{P_{HX}}. \quad (1)$$

where K is the proportionality constant. If C is to be as small as possible, the powder purification process and the crystal growth procedure must provide the condition $$K << 1, \quad (2)$$

and the process parameter should be very small:

$$\text{Process Parameter} = \frac{P_{H_2O}}{P_{HX}} << 1. \quad (3)$$

Constraint (2) depends on the chemistry of the material (MX) and the steady-state operation of RAP crystal growth; constraint (3) depends only on the latter. The basic equation for the competition is, $$X^-(c) + H_2O(g) \rightleftarrows OH^-(c) + HX(g) \quad (4)$$

and therefore, in practical situations we will have $$K \geq K_4, \quad (5)$$

the equilibrium constant of Eq. (4). The equality holds in the limit that the process is at equilibrium and not necessarily during crystal growth, a steady-state operation. Since one is dealing with metal halides where $K_4 << 1$, optimization of the RAP procedure consists of a search for fast reaction paths which yield, to a close approximation, the equality in Eq. (5) for the steady-state crystal growth operation. This concept can be demonstrated by examining the actions of HX, X₂, and COX₂ (carbonyl halide).

The RAP procedure using HX is described by Eq. (4). To obtain an analogous equation for X₂, two reaction paths have to be added.

$$X_2(g) + OH^-(c) \rightleftarrows X^-(c) + HX(g) + \tfrac{1}{2} O_2(g), \quad (6)$$

and $$X_2(g) + H_2O(g) \rightleftarrows 2HX(g) + \tfrac{1}{2} O_2(g). \quad (7)$$

Hence, $$K_4 = \frac{K_7}{K_6}, \quad (8)$$

where the subscripts of the equilibrium constants identify the equations. Similarly, with COX₂, $$COX_2(g) + OH^-(c) \rightleftarrows CO_2(g) + HX(g) + X^-(c), \quad (9)$$

and $$COX_2(g) + H_2O(g) \rightleftarrows CO_2(g) + 2HX(g). \quad (10)$$

Consequently, $$K_4 = \frac{K_{10}}{K_9}. \quad (11)$$

These three choices of reactive atmosphere involve different paths, i.e., different sequence of energy barriers. Therefore, they would differ in the steady-state approximation to the equality condition in Eq. (5). In addition, it should be noted that both X₂ and COX₂ produce HX and can, therefore, lead to the reaction path represented by Eq. (4). Since the production of HX is at the expense of H₂O (a molar conversion of one H₂O to two HX), these two RAP procedures provide a throttle on the processing parameter, $P_{H_2O}/P_{HX}$, as required by constraint (3). In the case of HX, a very rigid requirement on the dewpoint of the gas must be met and one is limited by the H₂O outgassed by the apparatus.

For the RAP procedure based on the free halogen (X₂), the effective throttling of the process parameter, $P_{H_2O}/P_{HX}$, by Eq. (7), is limited to F₂ and Cl₂. In the case of chlorine, the equilibrium constant in Eq. (7) reaches a value of unity at 600°C. This means that chlorine is the stronger oxidant above this temperature and oxygen at the lower temperatures. At the extreme, X₂ = I₂, free iodine is displaced by oxygen from HI(g) at room temperature.

The reaction which is most useful to eliminate OH⁻ is the following electron-transfer process:

$$X + OH^- \rightleftarrows X^- + OH \quad (12)$$

The free energy change (unit: kcal mole⁻¹) for the forward displacement is favorable for all X: X = F, −42.7; X = Cl, −48.0; X = Br, −41.7; and X = I, −36.0. Because of this result, the optimization of RAP hinges on the steady-state concentration of X which can be achieved by the procedure chosen. Consequently, it is necessary to reexamine the use of X₂ and HX, but this time as sources of X by thermal dissociation at temperatures not much above the melting point of the metal halide.

The dissociation energy (unit: kcal mole⁻¹) of X₂ shows that thermal dissociation of X₂ is an impractical path for achieving a high concentration of X: F₂, 38.0; Cl₂, 57.9; Br₂, 46.1; and I₂, 26.1. In fact, these results show that competing sink for X will be, $$X + X \rightarrow X_2 \quad (13)$$

In the case of HX, the dissociation energy (ΔE), and the degree of thermal association (α) at 1 atm are given in Table 1.

TABLE 1

Thermal Dissociation of Halogen Hydrides
$$2HX \rightleftarrows H_2 + X_2$$
$$2(1-\alpha) \rightleftarrows \alpha + \alpha$$

| HX (g) | ΔE, kcal mole⁻¹ | α at 300°C | α at 1000°C |
|---|---|---|---|
| HF (g) | 128.4 | — | — |
| HCl (g) | 44.1 | 3 × 10⁻⁹ | 1.4 × 10⁻⁴ |
| HBr (g) | 24.9 | 3 × 10⁻⁵ | 5. × 10⁻³ |
| HI (g) | 2.3 | 0.19 | 0.33 |

It would seem that HI(g) is a good candidate. That is true if the dissociation is unimolecular, $$HX \rightarrow H + X, \quad (14)$$

with the chain reaction sustained by the cycle, $$H + HX \rightarrow H_2 + X$$
$$X + HX \rightarrow X_2 + H \quad (15)$$

and terminated by the reverse of Eq. (14), by Eq. (13), or by $$H + H \rightarrow H_2. \quad (16)$$

Unfortunately HI thermally dissociates bimolecularly, $$2HI \rightarrow H_2 + I_2, \quad (17)$$

with an activation energy of 44.0 kcal mole⁻¹; the unimolecular decomposition shown by Eq. (14) requires a photodissociation path with an hν ≥ 69.0 kcal mole⁻¹ (~ 3 ev).

Various schemes can be suggested by which a sizable steady-state concentration of X may be achieved, e.g., molecular beam (collision methods), electrical discharge, photodissociation, etc. However, these schemes render the one-step RAP growth awkward, if not impractical. Besides, they make use of corrosive sources which present corrosion problems from the inlet through the outlet channels of the apparatus.

For simplicity, the thermal-dissociation approach is favored because it can be easily accommodated by the degree of freedom in the processing temperature (t), 25°C t 1000°C. Naturally, halogen sources must be employed which are easier to dissociate. Such sources are normally inert. Since X and X₂ are generated only at the required site, corrosion problems are mostly on the exit side of the apparatus.

In practice, the metal halide powder is placed into a reaction chamber of the type shown in the FIGURE and the apparatus is evacuated. Heat is applied to raise the temperature of the powder to a temperature of from 300°C up to the melting point of the material. The halide-source species in the vapor is then passed through the reaction chamber whereby the scrubbing action is accomplished. After scrubbing for several hours the temperature of the reactor is sequentially lowered whereby the molten material is allowed to solidify, in the presence of the scrubbing source, into an ingot of reduced specific surface area.

In the schematic diagram of the apparatus shown in the FIGURE, helium is employed as a carrier gas for the halidesource (eg. CCl₄ in the case of chlorides) vapor (1) contained in a pyrex bubbler (2) because it is capable of attaining a very low dewpoint and, therefore, its use avoids the complication of hydrolysis in the reaction chamber (3). The reaction chamber is made of quartz, heated by a resistance furnace (4) or any other satisfactory mode of heating, and contains inlet (5) and outlet (6) tubings for the gas. Within the reaction chamber is a cylindrical cradle (8) which serves as a mold for the molten powder (9) during the scrubbing process. Other materials for the reaction chamber may be employed. However, our studies have shown that complications may be avoided by constructing the reaction chamber and casing cradle (8) out of quartz. The apparatus shown contains three-way teflon stopcocks (7) which facilitate the evacuation of the system and control the flow of reactants.

EXAMPLE I

The purification of KCl powder provides a convenient demonstration of the application of my invention. KCl powder, placed in a quartz reaction chamber of the type shown in the FIGURE, is heated to its melting point and exposed to CCl₄ vapors. Impurity cleanup was demonstrated directly by employing detectable concentration levels of the impurities. The results are shown in the following table.

TABLE 2

| Impurity Cleanup in Molten KCl Under CCl₄ Exposure Time of Melt to CCl₄ | | | |
|---|---|---|---|
| | 0 Hour* | 5 Hours | 20 Hours |
| Impurity | Weight Percentage | | |
| Mg | 0.0050 | 0.0016 | 0.0014 |
| Pb | 0.22 | 0.039 | 0.041 |
| Ni | 0.032 | 0.020 | 0.035 |
| Fe | 0.023 | 0.0010 | ND < 0.001 |

*Averaged over the ingot obtained from melting under He and freezing the melt rapidly.

The vapor pressure of molten KCl is ~1 mm. An approximate measure of the order of the relative fugacity of the dopants is the temperature of the pure form at its vapor pressure of 1 mm: FeCl₃, 194°C; PbCl₂, 547°C; NiCl₂, 671°C; and MgCl₂, 778°C. To correlate the order to the relative cleanup achieved in molten KCl, the evaporation flux of the solvent needs to be determined.

Consider first that, for a given impurity, a conservation relation holds, $$\frac{\bar{x}_f}{x_i} = \frac{1 - \frac{x_s}{x_i} \cdot \frac{m}{M}}{1 - \frac{m}{M}} \quad (18)$$

where $x_i$ is the initial concentration in the melt (weight M), $x_s$ is the concentration in the sublimate (weight m), and $\bar{x}_f$ is the final concentration averaged over the residue (weight M−m). In terms of measurable parameters, $$\frac{m}{M} = ft\sigma \quad (19)$$

where f is the evaporation flux ($g\ cm^{-2}hr^{-1}$) at constant temperature ($T \geq T_{mp}$), t is the soak duration (hr), and $\sigma$ is the specific evaporation surface of the melt ($cm^2 g^{-1}$). For the process to be practical, the first constraint is $$\frac{m}{M} << 1 \quad (20)$$

i.e., the evaporation loss of the host material should be low.

Two runs were carried out with KCl in a quartz boat held at 840°C, at a gas (He + CCl₄) flow rate of 2.5 × 10³ cm³ hr⁻¹ and a mole ratio of He:CCl₄ = 7. The results are as follows (a = evaporation surface):

Run 1: M=7.36 g, a=10.3 cm², t=5.0 hr, m=0.169 g
Run 2: M=7.72 g, a=11.2 cm², t=20.0 hr, m=0.560 g

The value of m was obtained by the difference in weight before and after soak. The average of the two runs yields $\sigma = 1.43 \pm 0.04$ cm² g⁻¹ and $f = (2.9 \pm 0.6) \times 10^{-3}$ g cm⁻² hr⁻¹. For these values of f and $\sigma$, an overnight scrub (t = 15 hr) is a practical processing time because m/M = 0.062 according to eq. (19), which meets the constraint shown in inequality (20).

The second constraint is seen in eq. (1) in terms of $x_s/x_i$, the relative volatility factor.* Impurities with $$\frac{x_s}{x_i} \geq \frac{M}{m} \quad (21)$$

would have been stripped out of the melt at t < 15 hr. Only those with $$\frac{x_s}{x_i} < \frac{M}{m} \quad (22)$$

would still be detectable in the residue (i.e., $x_f$ measurable). For the given case, M/m = 16. A relative volatility factor of 10 would strip out only 60% of the impurity (i.e., $x_f^-/x_i = 0.40$).

* In ideal-solution behavior where the host (solvent) follows Raoult's law, $P_1 = (1 - x_j) P_1°$, and consequently, the impurity (solute) obeys Henry's law, $P_2 = x_i P_2°$. It can be shown that $x_2/x_i \approx P_2°/P_1°$ when $(x_i, x_s) << 1$.

For the impurity cleanup work reported in Table 2 $\sigma = 0.5$ cm² g⁻¹. From the value of f, it follows that m/M = 0.0073 at t = 5 hr, satisfying constraint (18). Using the 5 and 0 hour values to calculate $\bar{x}_f/x_i$, where $x_f$ is the final concentration averaged over the residue, the $x_s m/x_i M$ value for each impurity in decreasing order of volatility from the melt is as follows: $Fe^{3+}$, 1.0; $Pb^{2+}$, 0.8; $Mg^{2+}$, 0.7; and $Ni^{2+}$, 0.4. The actual volatility order shows that $NiCl_2$ has a relatively low fugacity in the melt (KCl).

In a zone refining experiment, designed to directly measure the effect of RAP scrubbing, M = 450 g and a = 170 cm², therefore, $\sigma = 0.38$ cm²g⁻¹. The molten zone had a residence time of 0.4 hr. With three passes, $t$ = 1.2 hr. It follows from eq. (19) that M/m = 760. It is seen that Si has $x_s/x_i > 750$ and satisfies eq. (4); i.e., $(x_s/x_i) \cdot (m/M) \geq 1$. To this class belongs the volatile chlorides of B, Al, Fe, Cr, Bi and Ti. The latter group, taken collectively, is characterized by $x_s/x_i > 200$. The others belong to the class characterized by eq. (22), i.e., $(x_s/x_i) \cdot (m/M) < 1$. Because of leaching of the vitreous carbon boat Ca, Mg and Cu account for $x_s/x_i = 30$, while the rest amount to $x_s/x_i > 8$. Using the impurity-class content of the original powder as the weighting factor, the average for three zone passes under RAP is $x_s/x_i > 100$. The purification effected is even better if we include the effect of segregation in the condensed phase. The results of these calculations lead us to believe that RAP purification is capable of converting KCl from 99.9% to 99.99% purity in both metal ion and anion species.

What is claimed is:

1. A method for upgrading the purity of alkali metal chlorides, bromides, and iodides for use as laser crystal starting materials by removing cation and anion impurities comprising the steps of placing the metal halide in a reaction chamber, heating said halide to its molten state, exposing said metal halide to halide-source species in the vapor phase which yields by dissociation a nascent halogen corresponding to the metal halide being treated from 5 to 20 hours and allowing the purified material to cool to its solidification temperature in the presence of said nascent halogen.

2. The method of claim 1 wherein the metal halide is a chloride and wherein the halide source species is carbon tetrachloride.

3. The method of claim 1 wherein the metal halide is a bromide and wherein the halide source species is $CBr_4$ or $CHBr_3$.

4. The method of claim 1 wherein the metal halide is an iodide and wherein the halide source species is $I_2$ or $CHI_3$.

* * * * *

UNITED STATES PATENT OFFICE
CERTIFICATE OF CORRECTION

PATENT NO. : 3,932,597
DATED : January 13, 1976
INVENTOR(S) : Ricardo C. Pastor

It is certified that error appears in the above-identified patent and that said Letters Patent are hereby corrected as shown below:

Column 5, line 2, "$25°C \ t \ 1000°C$" should read --$25°C \leq t \leq 1000°C$--.

Signed and Sealed this

Eighth Day of March 1977

[SEAL]

Attest:

RUTH C. MASON
*Attesting Officer*

C. MARSHALL DANN
*Commissioner of Patents and Trademarks*